G. H. DOW.
Churn.
No. 79,739. Patented July 7, 1868.
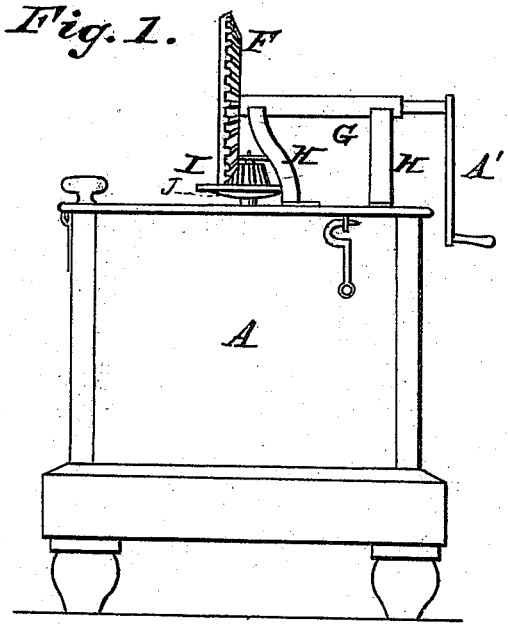
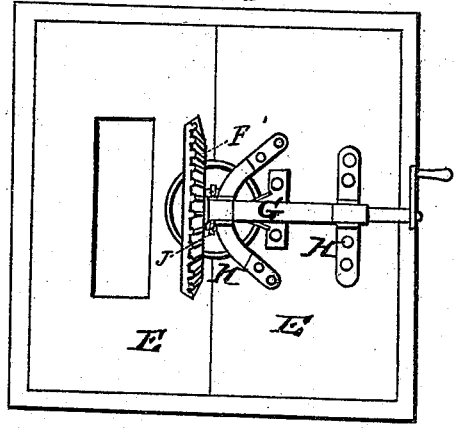
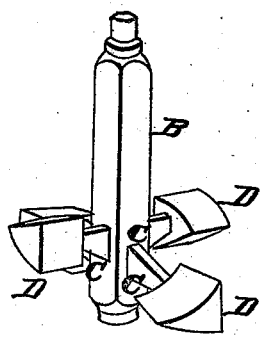
Witnesses:
J H Burridge
H. Coon
Inventor:
G H Dow

United States Patent Office.

GEORGE H. DOW, OF FREEPORT, ILLINOIS.

Letters Patent No. 79,739, dated July 7, 1868.

IMPROVEMENT IN CHURNS.

*The Schedule referred to in these Letters Patent and making part of the same.*

TO ALL WHOM IT MAY CONCERN:

Be it known that I, GEORGE H. DOW, of Freeport, in the county of Stephenson, and State of Illinois, have invented certain new and useful Improvements in Churns; and I do hereby declare that the following is a full and complete description of the same, reference being had to the accompanying drawings, making part of this specification, in which—

Figure 1 is a side view of the churn.

Figure 2, a view of the top.

Figure 3, a detached section.

Like letters of reference refer to like parts in the different views presented.

In fig. 1, A represents the case or body of the churn, in which is arranged the dasher shown in fig. 3, consisting of the shaft B, having its bearing in the bottom of the churn, in a point and step provided for that purpose. From each side of said shaft proceed arms C, to which the angular beaters D are secured, which are of the shape and arranged in relation to each other as shown in the drawing, fig. 3. The upper end of the shaft is held in position by the cover, which is made in two sections, E E'. On section E' is mounted the wheel F on the shaft G, having its bearings in the stays H. Said wheel engages in a small bevel-pinion, I, secured to the upper end of the shaft B.

Immediately below said pinion is a dish or saucer, J, the purpose of which is to catch and retain the dirt that may fall from the gearing while in operation, and thus the contents of the churn are kept clean from the droppings of the wearing-gear.

The practical operation of this churn is simple and direct. Thus, the cream on being put in is thoroughly agitated by rotating the beaters by the gearing, operating the same by the crank A'. The peculiar shape of the beaters is such that the cream is thrown upward and downward as they revolve, thereby separating and dashing the cream in such a manner that the butter is brought and separated in a very short time.

As above said, the saucer J catches all the droppings and dust from the wearing-gearing, so that none can find its way into the churn.

What I claim as my improvement, and desire to secure by Letters Patent, is—

The beaters D as arranged, in combination with the shaft B, saucer J, and case, in the manner as and for the purpose set forth.

GEORGE H. DOW.

Witnesses:
C. C. SHULER,
WILLIAM WIMER.